(12) United States Patent
Kojima (10) Patent No.: US 7,255,445 B2
(45) Date of Patent: Aug. 14, 2007

(54) PROJECTION TYPE IMAGE DISPLAY DEVICE

(75) Inventor: Akihiro Kojima, Kanagawa (JP)

(73) Assignee: Sony Corporation (JP)

( * ) Notice: Subject to any disclaimer, the term of this patent is extended or adjusted under 35 U.S.C. 154(b) by 219 days.

(21) Appl. No.: 10/884,965

(22) Filed: Jul. 7, 2004

(65) Prior Publication Data

US 2005/0110954 A1 May 26, 2005

(30) Foreign Application Priority Data

Jul. 9, 2003 (JP) ............................ P2003-272590

(51) Int. Cl.
*G03B 21/26* (2006.01)
*G03B 21/00* (2006.01)
*G03B 21/28* (2006.01)

(52) U.S. Cl. ............................ 353/31; 353/30; 353/94; 353/98

(58) Field of Classification Search ................. 353/33, 353/94, 34, 37, 98, 99; 348/742, 743
See application file for complete search history.

(56) References Cited

U.S. PATENT DOCUMENTS

| 5,121,137 | A  | * | 6/1992  | Taki et al. ................... 347/232 |
| 6,317,170 | B1 | * | 11/2001 | Hwang et al. ............... 348/750 |
| 6,327,093 | B1 | * | 12/2001 | Nakanishi et al. ........... 359/634 |
| 6,972,737 | B2 | * | 12/2005 | Furukawa et al. ............ 345/32 |
| 6,972,879 | B2 | * | 12/2005 | Ide .............................. 358/514 |

FOREIGN PATENT DOCUMENTS

JP          03-065916          3/1991

* cited by examiner

*Primary Examiner*—Melissa Jan Koval
*Assistant Examiner*—Andrew Kong
(74) *Attorney, Agent, or Firm*—Rader Fishman & Grauer PLLC; Ronald P. Kananen

(57) ABSTRACT

A projection type image display device is formed including projecting means for projecting an image onto a screen for image display by scanning laser light. The laser light includes a plurality of laser beams. The projecting means irradiates a substantially identical position on the screen with the plurality of laser beams with a time difference. An image signal applied to each of the laser beams has a time difference such that a preceding laser beam is delayed with respect to a succeeding laser beam so as to correspond to the time difference in irradiation.

10 Claims, 7 Drawing Sheets

PROJECTION TYPE IMAGE DISPLAY DEVICE

BACKGROUND OF THE INVENTION

The present invention relates to a projection type image display device for making image display using a laser as a light source.

A projection type image display device, that is, a so-called projector device is known as an image display device capable of large screen display.

A projection type image display device that displays images by using a laser as a light source and scanning a laser beam has been considered. The projection type image display device has advantages of providing ease of modulation with an image signal and good color reproducibility, and ensuring sufficient brightness, for example (see Patent Document 1, for example).

Laser light is collimated light emitted from a very small light emission point and having a small angle of divergence. Therefore, if the light directly enters the eye, the light concentrates as a small spot on the retina of the eye. When its laser power is high, the light causes a burn on the retina of the eye.

Thus, an international laser safety standard IEC 60825 series and internal standards of each country based on the international laser safety standard IEC 60825 series for devices using laser light provide stringent safety standards for manufacturers and users of laser devices. IEC 60825-1, for example, makes classification into classes 1 to 4 according to magnitude of laser power and provides guidelines to be followed by manufacturers and users for each class.

It is confirmed that an image display device scanning a laser beam over a screen is safe even with a laser of a considerably high intensity (laser class 3B or below), because laser light hits the screen and is then reflected and diffused in all directions.

[Patent Document 1]

Japanese Patent Laid-open No. Hei 3-65916

However, if the laser beam before being applied to the screen is directly looked at accidentally and an amount of light of the laser beam is large, the retina of the eye may be burned.

The risk is related to energy density ($W/m^2$) of the laser light, exposure duration, and size of an image point on the retina.

The higher the energy density ($W/m^2$) of the laser light, the longer the exposure duration, and the smaller the size of the image point on the retina, the greater the risk of a burn.

An international standard set by an international laser safety commission defines maximum permissible exposure (MPE) of the retina when laser light directly enters the eye. The maximum permissible exposure (MPE) represents a reference value based on various experiments and assessments by the commission. The value is at or below that no damage is caused to the eye of a person exposed to laser light (see the commission's international standard IEC60825-1 amendment 2 p31 Table 6).

Figure 6:
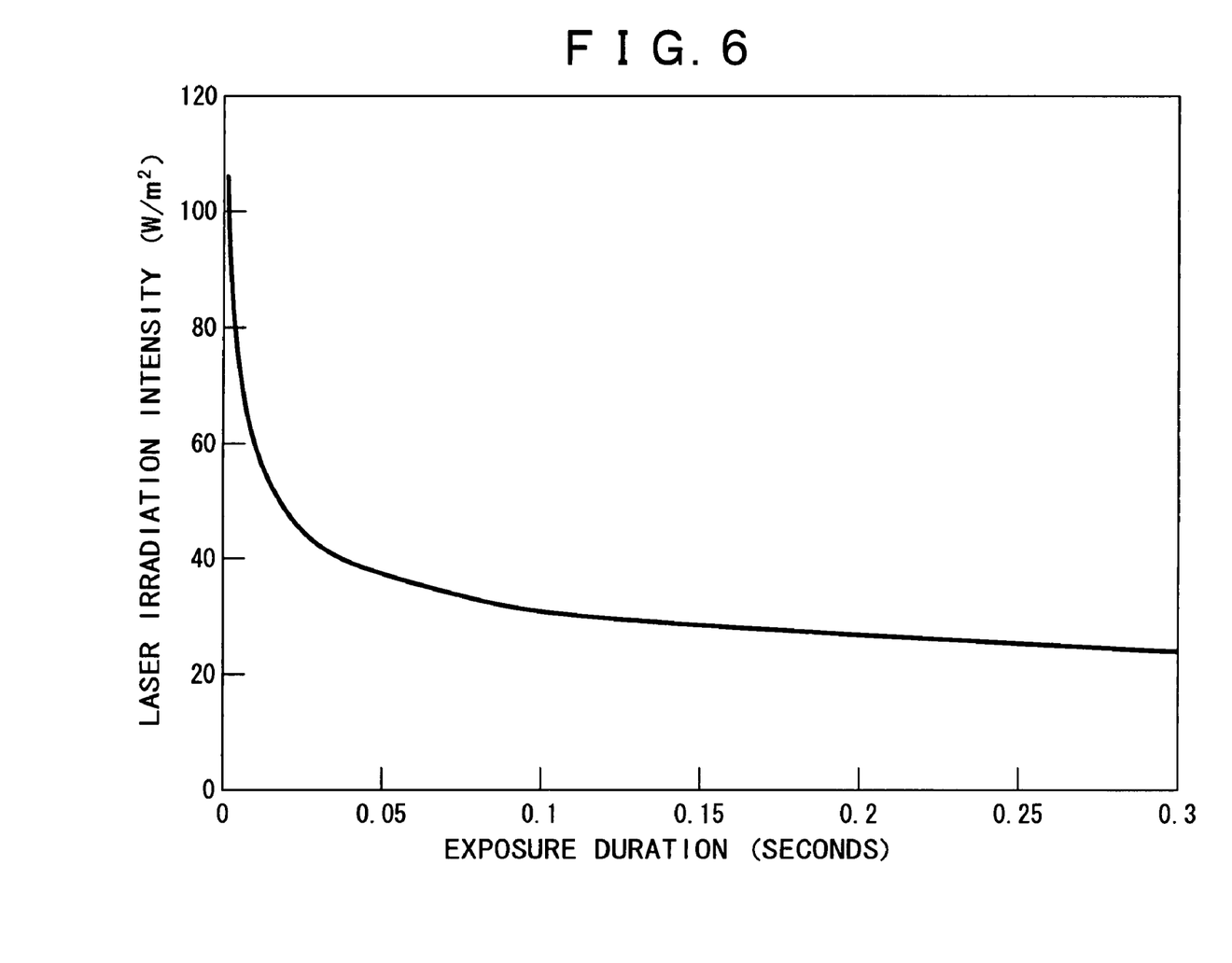
FIG. 6 is a diagram showing a relation between exposure duration and permissible laser irradiation intensity.

FIG. 6 shows a relation between exposure duration and permissible laser irradiation intensity (energy density [$W/m^2$]) for a fixed image point on the retina. The point is of a size of a minimum perceived image point or smaller (the most stringent condition of C6=1 in the above table; when a laser light source is a smallest object point) on the basis of a numerical value in a region of visible light (wavelengths of 400 nm to 700 nm) of the maximum permissible exposure defined in the above international standard.

FIG. 6 indicates that when the exposure duration becomes shorter than 0.05 seconds, the permissible laser light intensity is sharply increased, whereas in a region of longer exposure duration than 0.05 seconds, the permissible laser light intensity is not decreased very much even when the exposure duration is increased.

That is, as a tendency, the risk of causing damage to the eye by laser light is reduced as the laser exposure duration is shortened, while as the exposure duration becomes longer than about 0.05 seconds, decrease in the permissible laser light intensity is reduced.

This indicates that when the exposure duration is shorter than about 0.05 seconds (a one-shot laser light irradiation), safety can be enhanced by minimizing a time for which the eye can be irradiated, that is, by shorter pulse irradiation.

When the exposure duration becomes longer than about 0.05 seconds (in cases of a continuous-wave laser, a continuous pulse oscillation laser, and periodic scanning of laser light, for example), safety can be enhanced more effectively by decreasing laser light intensity ($W/m^2$) per unit time and per unit area rather than shortening a sum total of exposure duration.

From the above consideration, considering safety when audience directly looks at projected laser light, a device that makes image display by periodically scanning laser light is required to decrease laser light intensity ($W/m^2$) as much as possible.

Conventional devices that make color display by scanning laser light are not designed from this point of view.

Figure 7:
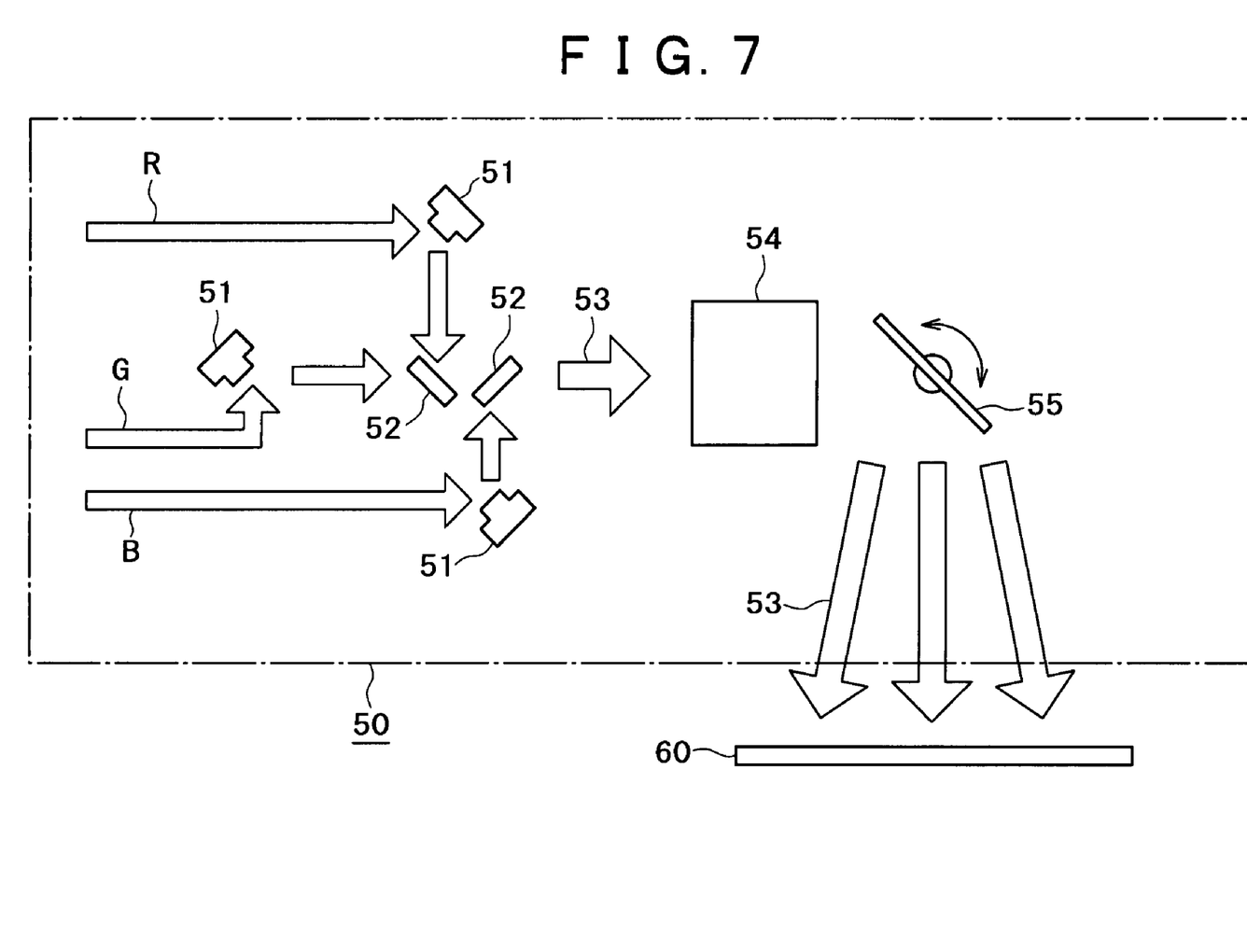
FIG. 7 is a schematic diagram of configuration of a conventional projection type image display device.

FIG. 7 is a schematic diagram of a conventional laser light scanning color image display device.

Pieces of laser light of three primary colors, that is, red, green, and blue are modulated by an image signal. These pieces of laser light of the three colors are multiplexed into one laser beam. The laser beam is passed through a projecting lens and scanned by a scanning mirror to display an image on a screen.

In the case of this device, when the laser beam enters the eye directly (rather than enter the eye as light diffused and reflected from the screen), a total amount of laser beam output of red, green, and blue enters the eye simultaneously.

This system is desirable from a viewpoint of ease of color shift adjustment for the three colors on the screen.

However, as shown by the above consideration, considering laser safety for the eye, the system cannot increase laser light intensity ($W/m^2$). Consequently the system cannot display brighter images.

SUMMARY OF THE INVENTION

In order to solve the above problems, it is an object of the present invention to provide a projection type image display device that can ensure safety and display brighter images.

According to the present invention, there is provided a projection type image display device including projecting means for projecting an image onto a screen for image display by scanning laser light. The laser light includes a plurality of laser beams, the projecting means irradiates a substantially identical position on the screen with at least two of the plurality of laser beams with a time difference, and an image signal applied to each of the laser beams has a time difference such that a preceding laser beam is delayed with respect to a succeeding laser beam so as to correspond to the time difference in irradiation.

With a configuration of the above-described projection type image display device according to the present invention, the projecting means irradiates the screen with at least two of the plurality of laser beams with a time difference. It is thereby possible to spread out and decrease laser light intensity per unit time and per unit area at a substantially identical position as compared with a case where all the laser beams are converged into one.

It is thereby possible to lower a risk of injury to the eye by laser light when a person directly looks at laser light.

Further, an image signal applied to each of the laser beams has a time difference such that a preceding laser beam is delayed with respect to a succeeding laser beam so as to correspond to the time difference in irradiation. Thereby, the image signals at an identical time are displayed on the same position on the screen, thus not affecting quality of an image displayed.

According to the present invention described above, a time difference is provided for timing of irradiation with each laser beam. Therefore, the plurality of laser beams do not concentrate on the screen. Hence, even when the laser beams enter the eye directly, the laser beams do not form a laser beam image concentrated on the retina. That is, the laser beams have a level that is not harmful to a person.

Further, a maximum laser intensity when the laser beams directly enter the eye can be reduced as compared with the conventional configuration.

Therefore, it is possible to construct a laser scanning image display device that is safe for the eye.

Further, since the image signals at an identical time are displayed at the same position on the screen, it is possible to ensure safety without dissatisfaction of audience.

Thus, a safer projection type image display device can be constructed when image display is made at the same brightness as in the conventional configuration.

On the other hand, when complying with the same safety standards as the conventional configuration, it is possible to display brighter images.

Therefore, the present invention makes it possible to realize a projection type image display device that can ensure safety and display brighter images.

For example, a laser device for household use is required to have a laser output that meets safety standards of classes 1 to 2. It is possible to display sufficiently bright images while meeting the safety standards.

BRIEF DESCRIPTION OF THE DRAWINGS

These and other objects of the invention will be seen by reference to the description, taken in connection with the accompanying drawing, in which.

DETAILED DESCRIPTION OF THE PREFERRED EMBODIMENT

Figure 1:
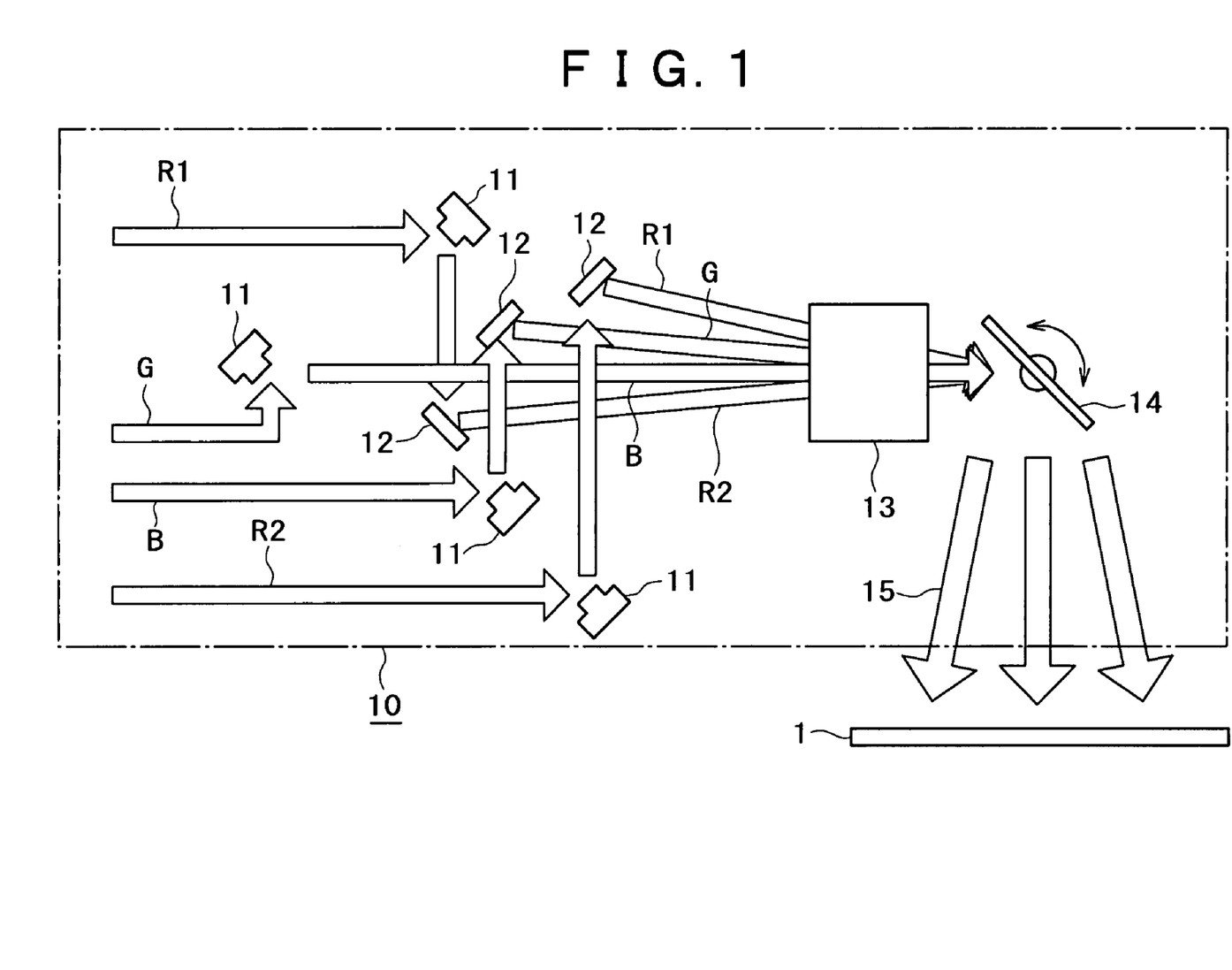
FIG. 1 is a schematic diagram of configuration of a projection type image display device according to one embodiment of the present invention.

FIG. 1 is a schematic diagram of configuration of a projection type image display device according to one embodiment of the present invention.

The projection type image display device 10 displays an image on a screen 1 by using pieces of laser light of red R1 and R2, green G, and blue B colors from a laser light source not shown in the figure. The pieces of laser light are extended in a vertical direction of an image area of the screen 1, horizontally scanning these pieces of laser light R1, R2, G, and B, and thus irradiating the screen 1 with the pieces of laser light R1, R2, G, and B. The two pieces of laser light R1 and R2 are used for red laser light.

The projection type image display device 10 includes GLV (Grating Light Valve) elements 11, mirrors 12, a projecting lens 13, and a scanning mirror 14. The GLV elements 11 modulate the pieces of laser light of the different colors R1, R2, G, and B from the laser light source into laser beams extended long one-dimensionally. The mirrors 12 change optical paths of the pieces of laser light R1, R2, G, and B. The projecting lens 13 enlarges and applies the pieces of laser light R1, R2, G, and B. The scanning mirror 14 scans the pieces of laser light R1, R2, G, and B.

The pieces of laser light of the different colors R1, R2, G, and B are modulated by being applied on the GLV elements 11, then passed through the projecting lens 13 via the mirrors 12, and scanned in a horizontal direction of the image area (image display area) of the screen 1 by the scanning mirror 14.

Thereby, a color image is displayed on the image area of the screen 1.

The red, green, and blue laser beams R1, R2, G, and B are modulated in laser power by respective image signals as in the conventional configuration shown in FIG. 7. Thereafter the red, green, and blue laser beams R1, R2, G, and B enter a center of the scanning mirror at respective different angles (see FIG. 4) and are scanned by the scanning mirror 14 to display an image on the screen.

Figure 2:
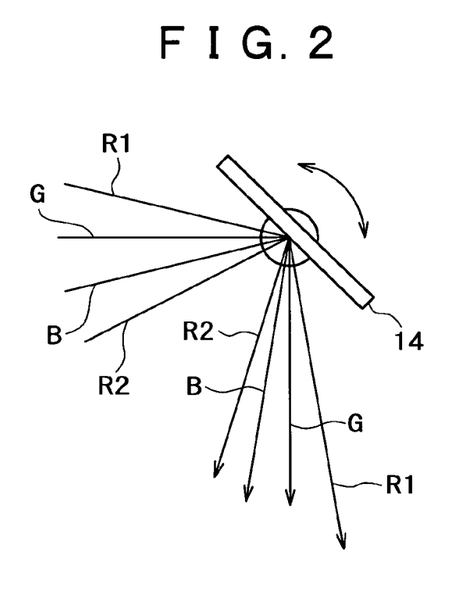
FIG. 2 is an enlarged plan view of an essential part in the projection type image display device of FIG. 1.

As shown in FIG. 2, which is an enlarged plan view of an essential part, the projection type image display device 10 according to the present embodiment does not multiplex the four pieces of laser light R1, R2, G, and B at a midway point. The four pieces of laser light R1, R2, G, and B enter the scanning mirror 14 separately and enter a mirror surface of the scanning mirror 14 at respective different angles of incidence.

Incidentally, the four pieces of laser light R1, R2, G, and B are reflected at the same position on the mirror surface of the scanning mirror 14 and are each made incident so as to be reflected at the center axis of the mirror surface of the scanning mirror 14.

Figure 4:
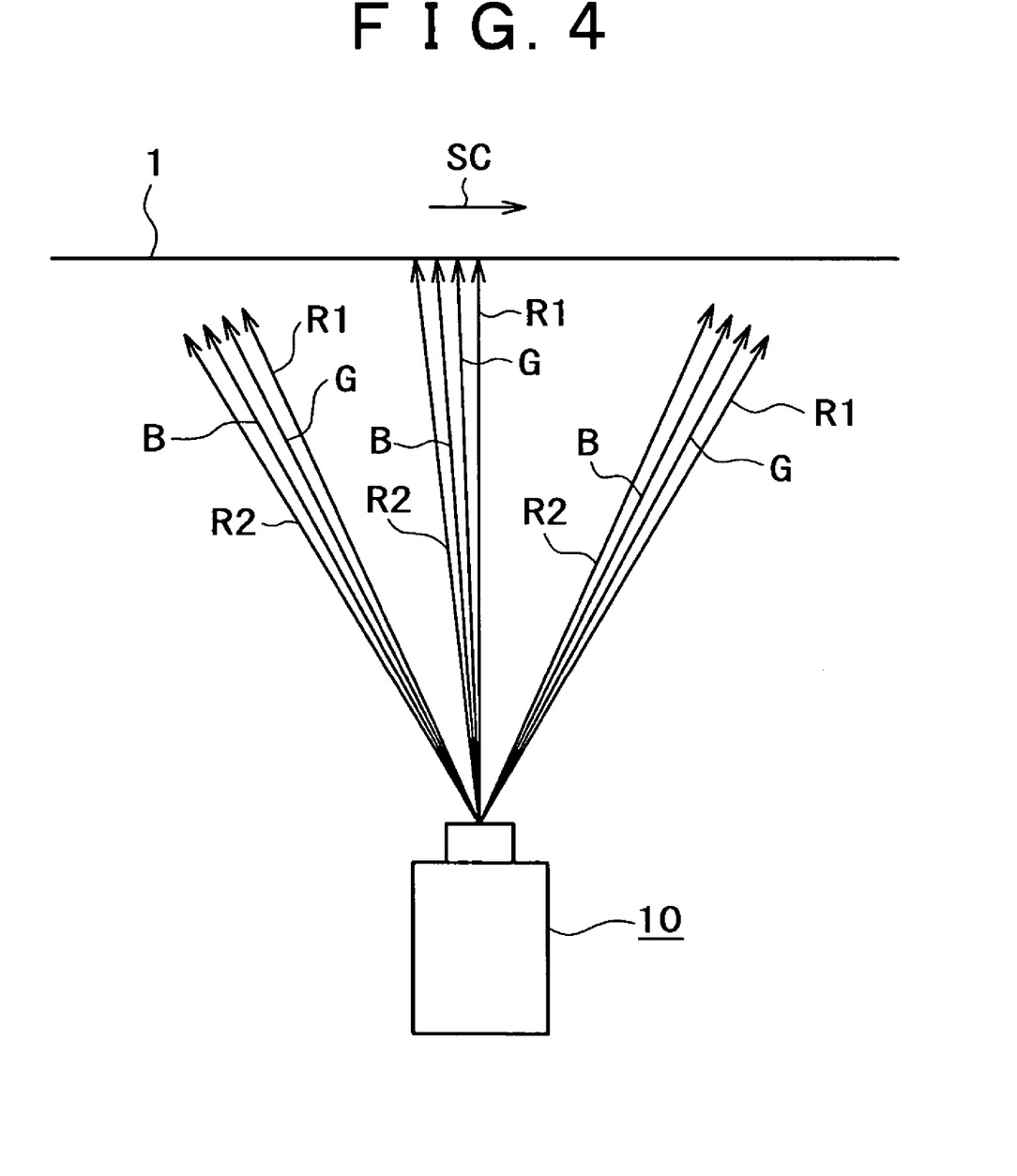
FIG. 4 is a diagram showing a state of irradiation of a screen with four laser beams by the projection type image display device of FIG. 1.

Thereby, the first red R1, the green G, the blue B, and the second red R2 are scanned in that order on the screen 1 (see FIG. 4).

However, when the pieces of laser light R1, G, B, and R2 are formed as shown in FIG. 2 and simply projected on the image area of the screen 1 as they are, the image on the screen 1 is displayed in a state of a color shift of the red, green, and blue images.

Accordingly, the projection type image display device 10 according to the present embodiment further provides a time difference for the image signals of the laser beams R1, G, B, and R2 so as to correct the shift.

This will be described with reference to FIG. 3. It is to be noted that in FIG. 3, it is assumed for simplicity of description that an image is displayed by two laser beams.

Figure 3:
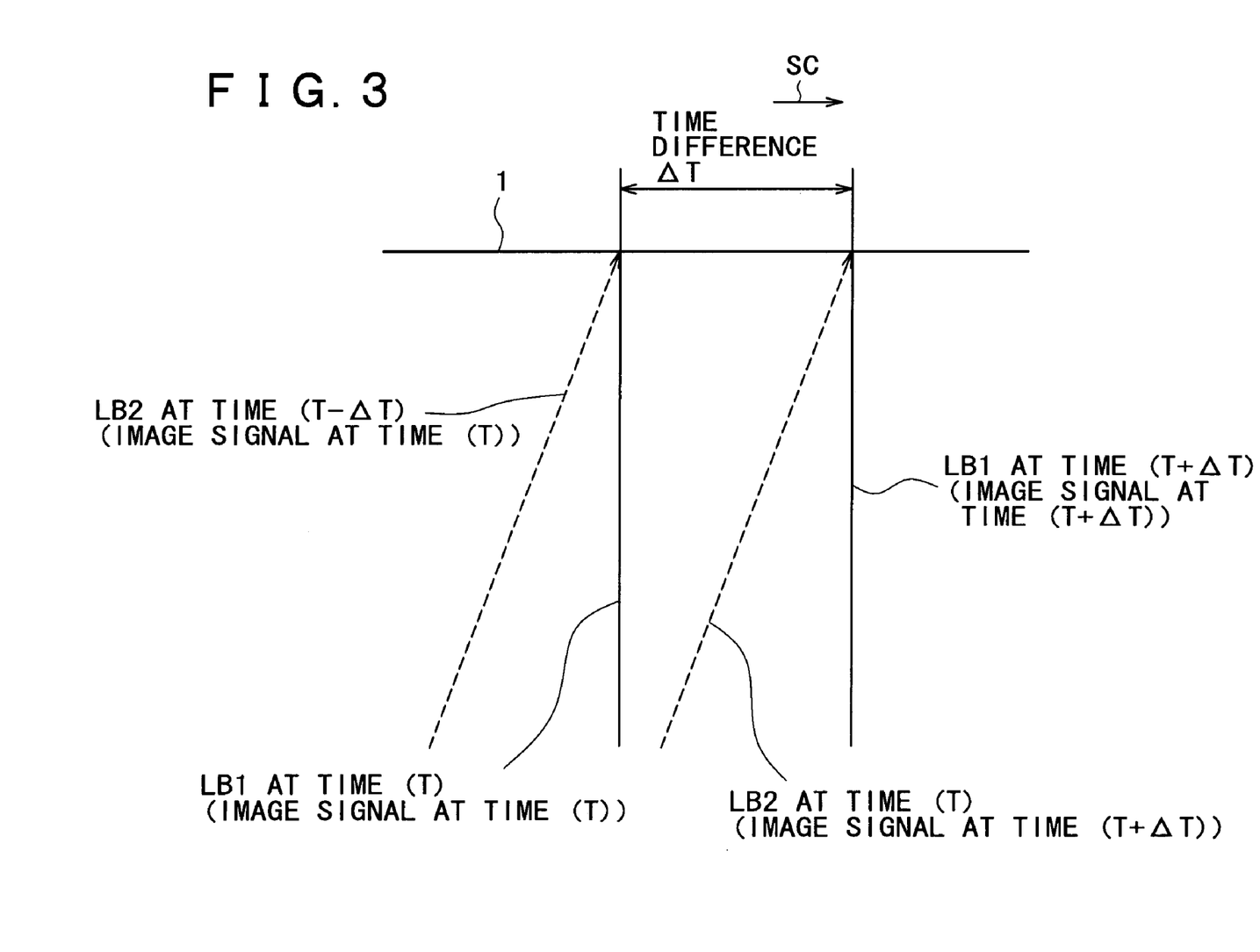
FIG. 3 is a diagram of assistance in explaining provision of a time difference for an image signal of each laser beam in the projection type image display device of FIG. 1.

Suppose that a positional difference corresponding to a time difference $\Delta T$ occurs between a first laser beam LB1 and a second laser beam LB2 shown in FIG. 3 on the screen 1. That is, when the two laser beams LB1 and LB2 are modulated by respective image signals of the same phase, an image is displayed in a state of a color shift.

Accordingly, the second laser beam LB2 scanned earlier by the time difference $\Delta T$ at the same position on the screen 1 is modulated by an image signal delayed by the time difference $\Delta T$, whereas the first laser beam LB1 modulated by a non-delayed image signal is applied.

Thereby, the image signals at an identical time are displayed on the same position on the screen 1.

In this case, times at which the two laser beams LB1 and LB2 shine on the screen 1 differ by the time difference $\Delta T$. However, when the time difference $\Delta T$ is within an afterimage time of the eye, the image signals of the first laser beam LB1 and the second laser beam LB2 are seen as a synthesized image.

Therefore, the same image as in the configuration of the conventional projection type image display device can be observed.

It suffices for the projection type image display device 10 according to the present embodiment as described above to irradiate the screen 1 with the four pieces of laser light R1, G, B, and R2 with the time difference $\Delta T$ between adjacent laser beams and modulate a preceding laser beam to be applied with an image signal delayed by the time difference $\Delta T$.

Since the time difference is thus provided for timing of irradiation with the laser beams R1, G, B, and R2, overscanning is performed at edges on both sides in the horizontal direction of the image display area of the screen 1 so as to correspond to the time difference. Specifically, a range of rotation of the scanning mirror 14 is set so as to perform overscanning.

When a frame frequency is 60 Hz, the number of pixels in the horizontal direction is 1960, and a scanning efficiency is 0.7, for example, it suffices to set the time difference $\Delta T$ at about 6 microseconds, for example.

Consideration will next be given from a viewpoint of laser safety for the eye.

As shown in FIG. 2, with the configuration of the projection type image display device 10 according to the present embodiment, the four pieces of laser light R1, G, B, and R2 enter the scanning mirror 14 at respective different angles. Therefore, the four pieces of laser light R1, G, B, and R2 are applied to the screen in respective different timings, as shown in FIG. 4. Thus, the four pieces of laser light R1, G, B, and R2 do not concentrate on the screen 1.

Hence, even when the laser beams R1, G, B, and R2 enter the eye directly rather than enter the eye as light diffused and reflected from the screen, the laser beams R1, G, B, and R2 similarly do not form a laser beam image concentrated on the retina.

Further, by selecting the time difference $\Delta T$ between laser beams, the projection type image display device 10 can be configured such that of the plurality of pieces of laser light R1, R2, G, and B projected from the projection type image display device 10, only one laser beam is applied to the pupil. That is, after one laser beam crosses the pupil, another laser beam enters the pupil.

Incidentally, this configuration may be made for a partial area corresponding to a defined range where a person can come near the projection type image display device 10 in a space crossed by the laser beams R1, G, B, and R2 between the projection type image display device 10 and the screen 1.

Such a configuration is effective in preventing not only an injury to the retina due to concentrated laser light but also an injury to the eye (for example an injury to the optic nerve). The injury is caused by a peak value of intensity of a sum of all laser light entering the eye at an identical time.

For such a configuration, it suffices to select the time difference $\Delta T$ such that time periods when the laser beams R1, G, B, and R2 are applied to a certain point on the screen 1 do not overlap each other. On the other hand, it is desirable to select the time difference $\Delta T$ as short intervals as possible between the time periods of application of the laser beams R1, G, B, and R2. This is because when the time difference $\Delta T$ is large and thus long intervals exist between irradiation times, a time required for scanning the entire screen is slightly increased, and an image shift caused by time can be recognized.

In the embodiment described above, two red laser beams R1 and R2 are used. This results from adjustment of the number of light sources for each color so as to equalize outputs from individual laser light sources in consideration of a ratio between laser outputs of the colors at a time of white display.

When a tint of white display is 6500° K, for example, a required ratio of laser power of red, green, and blue is 2:1:1. Thus, providing two red laser beam light sources makes it possible to reduce output per laser beam, so that intensity of laser light (W/m$^2$) entering the eye can be further equalized and reduced. In the case where a time difference is provided for irradiation with laser beams, when outputs of the lasers are not equal to each other, a maximum intensity of laser light entering the eye is determined by the highest-output laser beam.

Thus, to thus adjust the number of light sources for each color so as to equalize outputs from individual laser light sources in consideration of the ratio between the laser outputs of the colors at a time of white display, it is also possible to reduce the maximum intensity of laser light (W/m$^2$) entering the eye.

Figure 5:
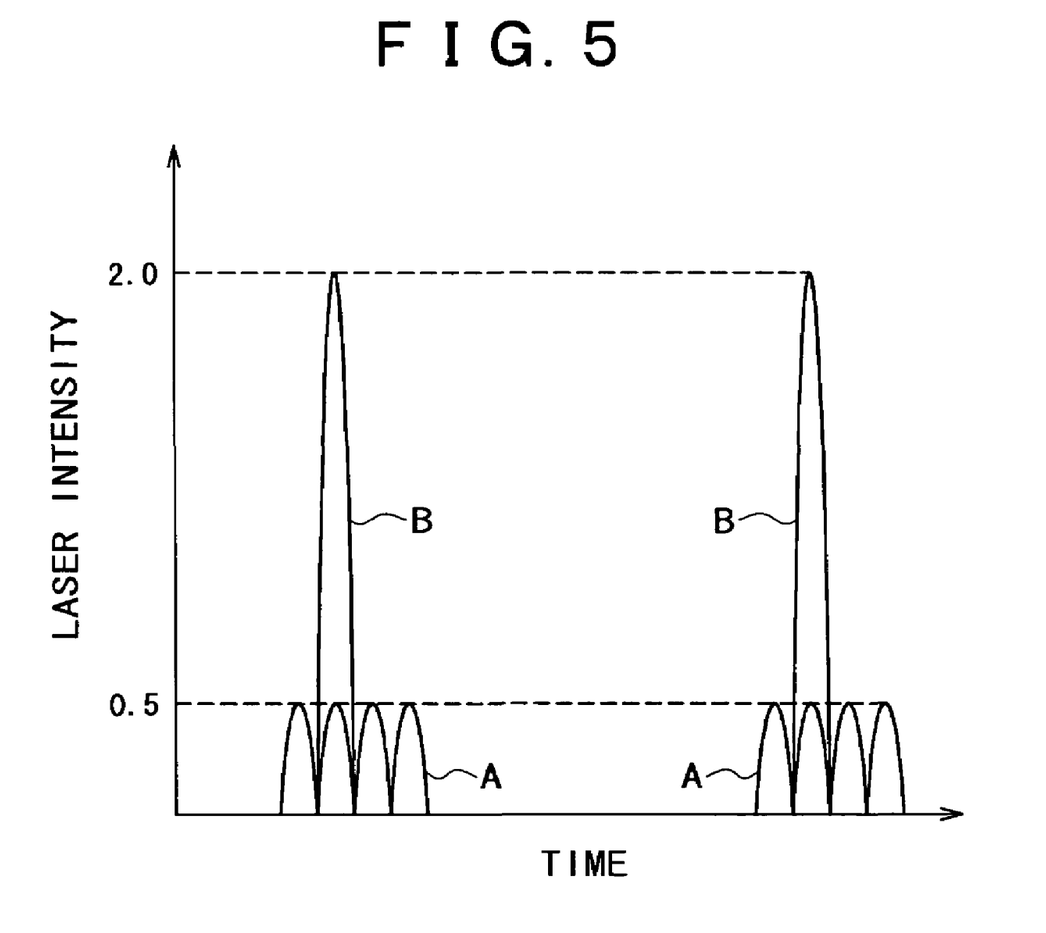
FIG. 5 is a diagram showing temporal distributions of laser intensity of laser pulses entering the eye for a comparison between the configuration of the present embodiment and a conventional configuration.

FIG. 5 shows temporal distributions of laser intensity of laser pulses entering the eye for a comparison between the configuration of the present embodiment and the conventional configuration. In FIG. 5, 'A' denotes a case of the configuration of the present embodiment and 'B' denotes a case of the conventional configuration.

Since four laser beams R1, G, B, and R2 are formed as described above, timings of application of the four laser beams do not overlap each other, as shown in FIG. 5, thus resulting in a maximum laser intensity of 0.5 (relative value), which is ¼ of a maximum laser intensity of 2.0 (relative value) of the conventional configuration.

The above-described projection type image display device 10 according to the present embodiment makes the four laser beams R1, G, B, and R2 incident on the scanning mirror 14 at respective different angles. The image display device 10 provides the time difference $\Delta T$ for timing of irradiation of the screen 1 with the laser beams R1, G, B, and R2. Thereby, the four laser beams R1, G, B, and R2 are not applied at a time and are not concentrated on the screen 1. Thus, even when the laser beams R1, G, B, and R2 enter the eye directly, the laser beams R1, G, B, and R2 do not form a laser beam image concentrated on the retina. That is, the laser beams have a level that is not harmful to a person.

Therefore, it is possible to construct a laser scanning image display device that is safe for the eye.

In addition, a time difference ΔT in timing of irradiation of the screen 1 is provided for a modulating signal for modulating each laser beam, or specifically a modulating signal for modulating a preceding laser beam is advanced by the time difference. Thereby, the image signals of the respective colors at an identical time are displayed at the same position on the screen 1.

Therefore, it is possible to ensure safety without dissatisfaction of audience.

Further, since two red laser beams R1 and R2 are provided, it is possible to obtain a laser output necessary to realize a required white color and reduce laser beam intensity per laser beam. Also, since a time difference is provided for timing of application of each laser beam, a maximum laser intensity when the laser beam directly enters the eye can be reduced as compared with the conventional configuration.

Thus, a safer projection type image display device can be constructed when image display is made at the same brightness as in the conventional configuration. The projection type image display device is not only safe for the eye but also improves safety in terms of irradiation of the skin.

On the other hand, when complying with the same safety standards as the conventional configuration, it is possible to display brighter images.

Therefore, it is possible to achieve both bright image display and safety. For example, a laser device for household use is required to have a laser output that meets safety standards of classes 1 to 2. It is possible to display sufficiently bright images while meeting the safety standards.

Incidentally, while the scanning mirror 14 is disposed in the rear of the projecting lens 13 in the foregoing embodiment, the projecting lens may be disposed in the rear of the scanning mirror.

Also, the order of scanning of the four laser beams R1, G, B, and R2 in the foregoing embodiment is not necessarily limited; the laser beams may be operated in other orders such as R1, R2, G, and B, and the like.

Further, while in the foregoing embodiment, description has been made of a case where images are displayed by scanning laser beams of three colors, that is, red R1 and R2, green G, and blue B, the present invention is not limited to devices that display images by scanning laser beams of the three colors. The present invention is applicable to image display devices of other configurations.

For example, in a projection type image display device for displaying monochrome images by monochrome laser light, a plurality of laser light sources are provided to form a plurality of laser beams of the same color. The present invention is applied to scan the plurality of laser beams with a time difference over the screen and provide a time difference for image signals applied to the respective laser light sources so as to correct a shift on the screen.

Further, image display may be made by color reproduction using not only laser beams of the three colors, that is, red, green, and blue but also still more pieces of monochromatic spectrum laser light. In this case, laser safety for the eye can be improved by increasing the number of laser light sources according to an increase in the number of spectrum lasers, providing a time difference for a scanning time, and performing modulation with a modulating signal with the time difference by the same method as described above.

Thus, the present invention is similarly applicable to configurations for displaying images using a plurality of laser beams.

Further, each laser beam may be divided into a plurality of laser beams.

Further, the foregoing embodiment has a time difference in irradiation of the screen 1 with all the four laser beams and a time difference between image signals thereof. However, a configuration having a time difference in irradiation of the screen with at least two or more of a plurality of laser beams and a time difference between image signals thereof has advantageous effects as compared with a configuration for converging and applying all laser beams.

Further, while in the foregoing embodiment and FIG. 3, description has been made of a constitution that applies laser beams at the same position on the screen with a time difference, a constitution that applies at least two laser beams at substantially the same position on the screen with a time difference is included in the scope of the present invention.

That is, the scope of the present invention includes not only a constitution that applies laser beams of image signals at an identical time at precisely the same position but also a constitution that applies laser beams of image signals at an identical time with such a degree of positional difference as to hardly affect an image viewed by an observer (a constitution that applies laser beams of image signals at an identical time at substantially the same position).

The present invention is not limited to the foregoing embodiment, and various other constitutions can be adopted without departing from the spirit of the present invention.

What is claimed is:

1. A projection type image display device comprising:
    projecting means for projecting an image onto a screen for image display by scanning laser light; wherein said laser light includes a plurality of laser beams;
    said projecting means irradiates a substantially identical position on said screen with at least two of said plurality of laser beams with a time difference; and
    an image signal applied to each of said laser beams has the time difference such that a preceding said laser beam is delayed with respect to a succeeding said laser beam so as to correspond to said time difference in irradiation,
    wherein said plurality of laser beams comprise laser beams of different display colors, and a color image is displayed as said image on said screen, and
    wherein a ratio between laser outputs of the display colors at a time of white display is satisfied, and a number of light sources for the laser beams of the display colors is set so as to equalize outputs of the laser beams.

2. The projection type image display device as claimed in claim 1, wherein all of said plurality of laser beams are each applied to said screen with a time difference.

3. The projection type image display device as claimed in claim 1, wherein said projecting means scans said laser beams by a mirror surface rotating on an axis and causes said time difference in irradiation by making angles of incidence of said at least two laser beams on said mirror surface different from each other.

4. The projection type image display device as claimed in claim 1, wherein said display colors are red, green, and blue.

5. The projection type image display device as claimed in claim 1, wherein a monochrome image is displayed by said plurality of laser beams.

6. A projection type image display device comprising:
    grating light valve elements; and
    a scanning mirror adapted to scan modulated first and second laser beams onto a screen, wherein:
    a first element of said grating light valve elements is adapted to use an image signal for modulating a first laser beam to form said modulated first laser beam,
    a second element of said grating light valve elements is adapted to use said image signal delayed by a time difference for modulating a second laser beam to form said modulated second laser beam, said first laser beam has a first laser beam color and said second laser beam has a second laser beam color, and said first laser beam color is the same as said second laser beam color.

7. The projection type image display device as claimed in claim 6, wherein said modulated first and second laser beams do not overlap in time.

8. The projection type image display device as claimed in claim 6, wherein said modulated first and second laser beams are applied onto a screen, application onto said screen of said modulated second laser beam being delayed from said modulated first laser beam by said time difference.

9. The projection type image display device as claimed in claim 6, wherein said scanning mirror is adapted to rotate on an axis.

10. The projection type image display device as claimed in claim 6, wherein a monochrome image includes said modulated first and second laser beams.

* * * * *